3,168,378
PROCESS FOR ANALYSIS OF ORGANIC COMPOUNDS

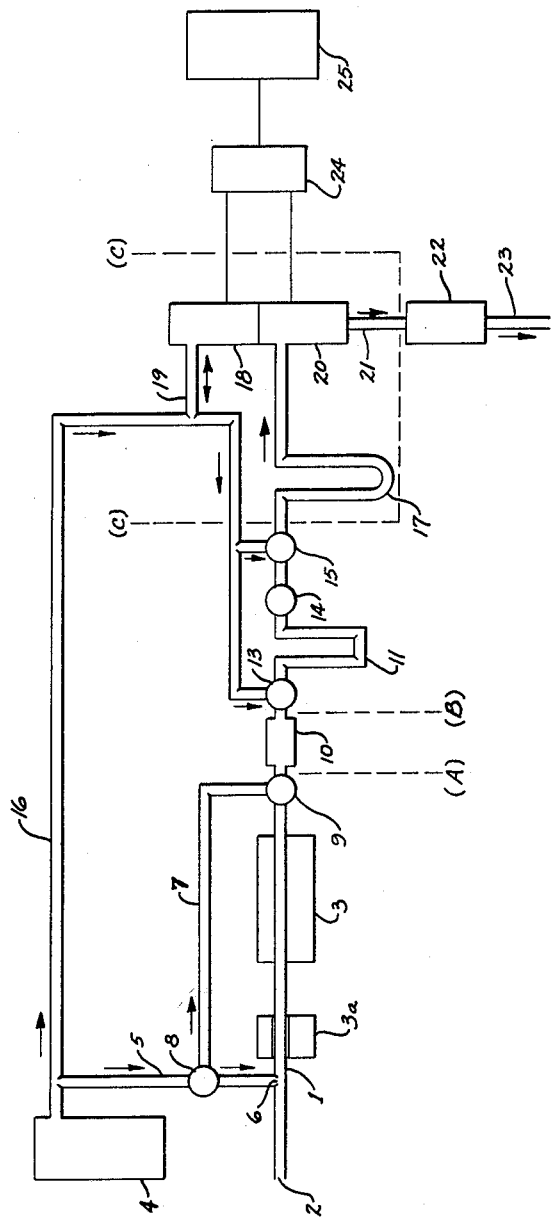

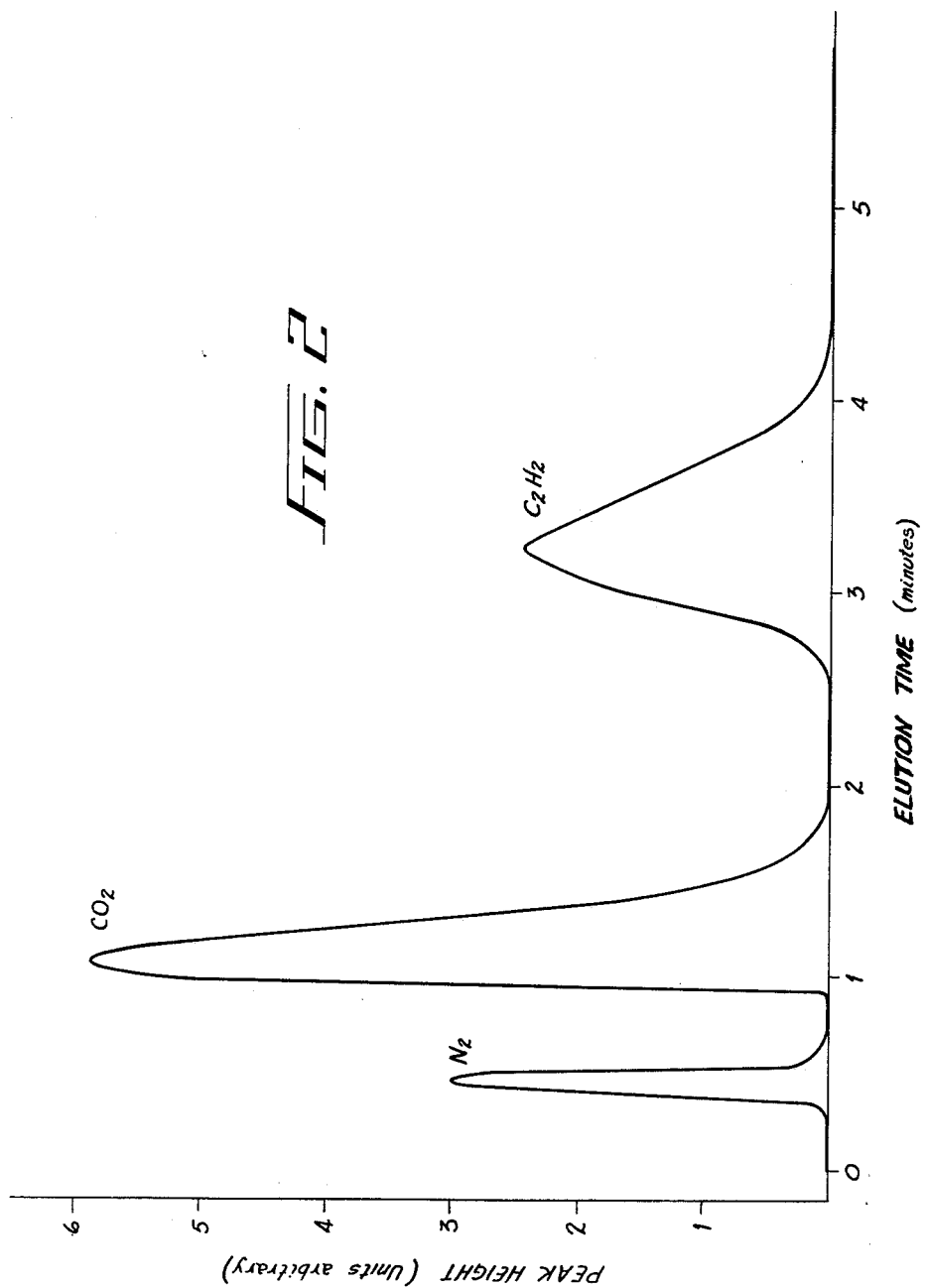

Charles Maresh, Somerville, N.J., and Oliver Emil Sundberg, deceased, late of Somerville, N.J., by Gertrude Sundberg, executrix, Somerville, N.J., assignors to American Cyanamid Company, New York, N.Y., a corporation of Maine
Filed Jan. 30, 1961, Ser. No. 85,927
10 Claims. (Cl. 23—230)

This invention relates to improvements in the analyses of organic compounds. More specifically, it provides for rapid, simultaneous determination of the carbon, hydrogen and nitrogen content. In particular, it provides a unique combination of a modified combustion technique, the collection of the combustion products and the elemental analysis of the latter by modified gas chromatographic technique using an inert sweeping gas.

Conventional procedures for the analytical determination of carbon, hydrogen and nitrogen in organic compounds involve combustion of the material followed by separation and meaturement of the combustion products. In the Liebig method, which may be modified for microanalysis according to Pregl, carbon and hydrogen are determined by combustion of the sample using excess oxygen and copper oxide, resultant carbon dioxide and water being taken up separately by suitable absorbents and separately weighed. For determination of carbon and hydrogen, oxygen is the normal sweeping gas.

If determination of nitrogen is necessary, a separate combustion is required. Usually this is done by the conventional Dumas method, the sample being oxidized with copper oxide in an atmosphere of carbon dioxide. Nitrogen is collected as a gas over strong caustic solution, which also absorbs the carbon dioxide and other combustion products. In determining nitrogen, carbon dioxide is normally used as the sweeping gas.

Apparatus for the determination of carbon, hydrogen and nitrogen by such conventional combustion methods is well known and commercially available. In a preferred form, that part of the combustion tube containing the copper oxide and/or other packing, is heated to combustion temperature, usually some 700°–900° C., in a fixed furnace. The sample is placed in the combustion tube just ahead of the fixed furnace. A second furnace is then moved along the tube at a predetermined rate, usually from just behind the sample to about the entrance to the fixed furnace, thereby passing over and enclosing the sample.

For a number of purposes, such procedures are highly useful. However, for others they are not wholly satisfactory. The time required usually is longer than desirable. Moreover, when nitrogen in addition to carbon and hydrogen must be determined, additional runs using different combustion and/or measurement techniques are necessary. Finally, in carbon-hydrogen determination, the weights of the absorption tubes must be accurately determined. Their necessary weight is too great for application to ultra micro-size samples when small differences in weight must be very accurately determined, as by using a quartz fiber balance.

It is a particular advantage of the present invention that the analysis may be readily completed in much less time. Not only carbon and hydrogen but also nitrogen are simultaneously determined. Moreover, in handling micro and ultra micro-size samples many objectional features of previous techniques are not subject thereto.

Gas chromatographic techniques also are well known and various types of apparatus for the purpose are commerically available. Therein, the gas mixture is taken up in a column containing a suitable absorbent or absorbent, being subsequently eluted with a suitable sweeping gas. Various gases are sequentially eluted and the elution time and quantity can be accurately determined for each. Moreover, these values may be recorded continuously during the run by known automatic recording devices. Elution may be carried out at a fixed temperature or in a programmed temperature schedule.

Where this technique can be applied it is highly useful. However, prior to the present invention, for a number of reasons it has not been considered applicable to treatment of the gaseous products evolved in combustion techniques, particularly when elements in addition to carbon and hydrogen are to be determined. For example, the physical factors involved in gas chromatography require simultaneous introduction of the total gas mixture into the absorbent column. Since gaseous combustion products are not formed uniformly in the combustion techniques, meeting this requirement has been precluded.

Another difficulty is that excess carbon dioxide is introduced in the Dumas procedure for nitrogen whereas in carbon-hydrogen determination, carbon is usually determined as carbon dioxide. Hydrogen in the Liebig procedures is usually determined at water. However, the latter is irreversibly taken up by many absorbents otherwise suitable for gas chromatography. For these and other reasons, a combination of the two techniques was considered wholly impracticable, despite the apparently obvious advantages thereof.

It is, therefore, a primary object of the present invention to overcome these difficulties and to combine the advantages of gas chromatography with those of both combustion techniques in an effective and reliable procedure. Thereby, a novel, overall method is obtained which permits rapid simultaneous determination of carbon, hydrogen and nitrogen.

These objects have been met in a combination which in view of the long-felt need for such a procedure is surprising not only in its effectiveness but in its ease of operation and reliability.

Discussion of the present invention may be more readily understood in conjunction with the accompanying drawings wherein:

FIGURE 1 is a schematic flow diagram of an apparatus showing the arrangement of the various features of the invention; and FIGURE 2 is a diagram showing a typical curve form recorded during the elution period.

In addition, the invention will be more fully described in conjunction therewith, carbon, hydrogen and nitrogen being taken as three elements to be determined simultaneously.

With reference to FIGURE 1, it will be seen that the portion to the left of line A represents a modified combustion tube. It includes a conventional combustion tube 1 into which the sample is introduced through the left end 2. Although end 2 is shown open for simplicity, it will be understood that during combustion it will be closed by some conventional means.

Combustion tube 1 is covered in part by fixed furnace 3 and movable furnace 3$a$, the latter being shown in the initial position some distance from 3. In practice, the sample usually is placed between furnaces 3 and 3$a$, its placement being accomplished in any desired known manner.

A unique feature of the present invention is the replacement of the conventional sweeping gas such as carbon dioxide or oxygen with a wholly inert gas. This eliminates the introduction of extra carbon dioxide or oxygen to interfere with subsequent steps in the gas chromatography. Herein, the term inert gas is used to designate such gases as helium, argon and the like which neither affect nor are affected by the combustion reactions. Because of its relatively lower cost, helium is most often used and will be taken herein as illustrative.

A supply of helium is shown at 4. It is released therefrom in controllable amounts, usually by means of a pair of valves, which being conventional are not shown. It flows down conduit 5 and enters combustion tube 1 at an open port 6. A by-pass conduit 7 is provided between conduit 5 and the exit end of tube 1. Three-way valves 8 and 9 permit either normal flow into port 6 during operation or a reverse flow into tube 1 through valve 9 and out through end 2. This arrangement provides for reverse flushing of the combustion tube and its packing between successive combustions if so desired.

As was noted above, one problem was caused by the fact that in previously-used techniques, hydrogen is usually accounted for as water. Water cannot be satisfactorily handled in some types of gas chromatographic equipment. A feature of the present invention is that this problem is solved by providing, in the train, between dotted lines A and B, a reaction tube 10. Exit gases from tube 1 pass therethrough before entering gas-collecting column 11. Tube 10 is packed with calcium carbide. Water in the exit gases from tube 1 in passing through the carbide is converted to acetylene.

Many repeated check tests were made on standard reference samples, both by the present invention and by conventional methods. These tests have shown that the conversion of $H_2O$ to $C_2H_2$ progresses rapidly and quantitatively. Surprisingly, they have shown also that the calcium hydroxide formed in tube 10 produces no significant retention of carbon dioxide.

As was noted above, in conventional Dumas techniques, a portion of tube 1 within furnace 3 is packed with particulate metal oxide, usually copper oxide. This is done to provide oxygen for combustion of carbon and hydrogen. This is done in the process of the present invention also. If so desired, other equivalent oxides such as those of nickel or cobalt may be substituted for the copper oxide.

In conventional carbon-hydrogen determination, the copper oxide zone of tube 1 is usually followed by a zone packed with an oxidizing agent, usually lead dioxide. In the present invention, this technique is not satisfactory. It is a further feature of the process of the present invention that oxidizing agent is replaced by a reducing agent, preferably copper metal. This serves to reduce any oxides of nitrogen in the combustion products to nitrogen. Thereby, any oxygen released in the nitrogen oxide reduction also is retained. This is not only desirable but has the further advantage of preventing any admixture of free oxygen and acetylene with the resultant potential explosive hazard.

Exit gases from reaction tube 10, which in the illustrative case comprises a mixture of nitrogen, carbon dioxide and acetylene, now enter a further distinctive feature of the present invention. This is the collecting of all the combustion products before releasing any of them into the chromatographic separation procedure. In the present invention this is done in a collecting column, shown in FIGURE 1 as U-tube 11.

In FIGURE 1 it will be noted that a three-way valve 13 is interposed between tubes 10 and 11. In the train, following tube 11, there are two additional such three-way valves 14 and 15. During the combustion period procedure, valve 14 is set to close the exit from tube 11 and both 13 and 15 are set to prevent entry of sweeping gas into the train.

Tube 11, as shown in FIGURE 1, normally is not covered. During the combustion period tube 11 is cooled with liquid nitrogen. Since the apparatus is usually relatively small, this is done by placing liquid nitrogen in a suitable container, such as a Dewar flask, and raising the flask up around tube 11, immersing the latter. Since the structure therefor is obvious and conventional it is not shown. This rapid cooling freezes $CO_2$ and $C_2H_2$ and they are held in tube 11 until combustion is complete. More elaborate provision for cooling may be provided, if so desired.

When there is no nitrogen in the gas mixture leaving tube 10, tube 11 contains no packing. Since nitrogen gas cannot be liquified by heat exchange using liquid nitrogen as the coolant, a further feature of this invention is the provision for collecting the nitrogen gas. This is done by providing a small amount of particulate solid absorbent packing in tube 11. Silica gel is wholly satisfactory for this purpose. If so desired, a second U-tube containing the silica, or its equivalent, may be used in series with tube 11, the same flask of liquid nitrogen being raised to immerse both tubes simultaneously. During this gas collecting or freezing period, which is continued until the combustion reactions are completed, the helium sweeping gas, which is not condensable by cooling with liquid nitrogen, is dicharged to the atmosphere through the unused third arm of three-way valve 14.

As shown in FIGURE 1, after leaving its source 4, helium not only flows through conduit 5 but also through a conduit 16 into one arm of each of valves 13 and 15.

When combustion, and the concomitant low temperature condensation, is completed, valves 13 and 14 are set to retain the content of tube 11 therein. The flask of liquid nitrogen is removed from around tube 11 and the condensed products are revaporized. This is readily accomplished, some heat being applied if so desired. Thereafter, valves 13, 14 and 15, in that sequence, are set to pass sweeping gas and the revaporized content of tube 11 on through the remainder of the train. The latter, as shown in FIGURE 1, comprises the conventional apparatus elements of a set up for gas chromatography. The latter may take various physical forms. Several different types are available commercially.

As the flows are shown in FIGURE 1, the gases are swept into and through a packed, gas-adsorption column 17. The gases are eluted by the sweeping gas successively. In the illustrative case, the order is nitrogen, carbon dioxide and acetylene. Helium is maintained in a reference cell 18 by an open conduit 19 connecting conduit 16 and cell 18. Eluted and eluting gas leaving column 17 pass into reference cell 20, out of cell 20 through conduit 21 into a standard type of rotameter 22 and thence from the system through discharge conduit 23. If so desired, rotameter 22 may be replaced by any other desired known means for measuring the rate of gas flow. Since only helium passes through the rotameter 22, this provides a measure of the rate of flow of sweeping gas.

Referring again to FIGURE 1, the reference and sensing cells 18 and 20 may be any type of equipment capable of measuring some property of the gas in the cells, by some means which indicates the property being measured as some form of electrical impulse or flow. Many types of such cells are known and available, operating on such varied principles as heated filaments, flame ion detectors, ionization gauges, radiation detectors, gas-density balances, and the like. In the cells represented at 18 and 20 in FIGURE 1, use of 24,000 ohm thermistors proved highly satisfactory. Other obvious equivalent units may be substituted.

A standard bridge circuit represented generally at 24 is used to balance and compare cells 18 and 20. Variations in bridge circuit 24 are continuously recorded on some suitable commercially-available recording device. Ordinarily variations of the electrical property being measured will be plotted against time as a continuous curve. One such curve is shown for illustrative purposes in FIGURE 2.

In many cases, it wil be found desirable to vary the attenuation as any one gas peak is being recorded since not all gases produce responses of uniform sensitivity in all cells. For example, in using the above-noted thermistors in the procedure of FIGURE 1, it was found good practice to use about a six-fold attenuation of the acetylene peak relative to the carbon dioxide peak. This practice of attenuation in recording a curve is conventional and does not form an essential feature of the present invention.

In the development of this invention, constant elution temperatures were found generally satisfactory. For this reason, those units of FIGURE 1 which are enclosed within dotted line C—C were immersed in a mineral oil bath which was controlled to constant temperature. Use of the immersion bath is not critical, however. A good general elution temperature range was found to be from about 30° to about 35° C., but this range may be extended if necessary or desirable. For constant temperature system, control of the selected temperature to within about ±0.2° C. is good practice. In some cases, it may be found that the latter portion of the elution period may be shortened by using higher temperatures. If so, an automatic temperature increase control may be installed. Such devices and their use are conventional. However, where such temperature changes are not essential, it is preferable to avoid this unnecessary complication.

As a packing in both tube 11 and column 17, silica gel proved wholly satisfactory. A good, practical particle size range was found to be from about 30 to about 60 mesh (U.S. Standard). Other known solid substrates may be used if so desired. These include, for example, such materials as alumimna gel, mixed metal oxide gels, so-called "molecular sieve-type" adsorbents, activated charcoal and the like. Liquid on solid subtrates, both organic and inorganic, such as polyethylene glycols, methyl silicone on diatomaceous earth or fire-brick and the like also may be used in column 17.

In the foregoing discussion, water in the combustion product gases was handled by conversion to acetylene. Alternatively, in tube 10, water may be converted to other gases, for example to hydrogen as by reaction with $CaH_2$ or $LiAlH_2$ or their equivalents; or to methane or other lower alkanes that are normally gases by use of the corresponding alkyl Grignard reagent. Using silica gel, if necessary, it even may be handled as $H_2O$ per se. However, to do so requires providing for programmed temperature control. As discussed above, this is undesirable. Conversion to acetylene is the simplest and most economical procedure and for this reason, if no other, is the preferred modification. Conversion to the other gases noted is, however, quite practical.

In general, operation as described above, using helium or an equivalent inert gas, is preferred. In general a moderate gas pressure overpressure will be used. It need be sufficient only to prevent extraneous gases leaking into the apparatus and to overcome the back pressure of the set up. This will usually vary from a few ounces to about two or three pounds' gauge. Higher pressure may be used but serves no useful purpose. However, the use of pressure is not critical. If so desired, the procedure may be operated under vacuum, but the added expense of keeping the apparatus tight against leakage from the atmosphere is not warranted in most cases.

Where completely automatic operation is desirable, it is readily possible to set up conventional additional apparatus for automatic sequential actuation of the several valves. This can be extended to automated sample weighing and insertion. Addition of a known computer or integrating device to, or its substitution for, the recording device discussed above will provide for automatic computation of the elemental content or for direct reading of such values on a recording device. Such modifications, however, are concerned with the apparatus used and not the essential features of the procedure of the present invention.

Calibration of any one set up, to interpret the data obtained in the form of recorded curves such as that of FIGURE 2, is done in the following way. Though not essential, a preliminary series of runs in which $CO_2$, $H_2O$ and $N_2$ are injected into the apparatus is helpful. Thereby, their approximate retention time in chromatographic column 17 and the location of the several corresponding peaks on the curve drawn by recorder 25 are determined.

Thereafter, a series of runs is made using various weights of samples of a pure compound of known composition. For each of the $CO_2$, $C_2H_2$ and $N_2$ peaks the area under each is measured in convenient units and plotted against the known weight (mg. in FIG. 2) of carbon, hydrogen or nitrogen, respectively, in each sample. Using a sufficient number of different weights of sample to obtain sufficient points to define the slope, straight line relationships will be found to result.

Once these calibration plots are drawn, the elemental content of any sample may be readily calculated, either by using the slope of the calibration curve or by reading the weight of element from the curve in known manner. For example, knowing the $CO_2$ peak area and the sample weight, the weight percent of carbon in a sample may be calculated from the $CO_2$ peak calibration curve using respectively one of the two formulae:

$$\text{Percent C} = \frac{\text{slope }(CO_2) \times \text{area }(CO_2) \times 100}{\text{mg. of sample}} \quad (I)$$

$$\text{Percent C} = \frac{\text{mg. C} \times 100}{\text{mg. of sample}} \quad (II)$$

Because the relationships plotted for the peak calibration curves are relative, the attenuation of any one curve by the recorder and the units of measure of peak height and area do not affect the result and may be expressed in any convenient units.

In using the present invention to determine simultaneously the combination of carbon, hydrogen and nitrogen, the usual precautions should be observed against introducing diluents such as water, air and the like. It also will be found that inclusion of a number of other hetero elements in the compound being analyzed does not interfere with the practice of this invention. For example, if sulfur or halogens are present, they may be eliminated by packing a short zone of tube 1 with silver. The use of silver for such purposes is known from the use of previous techniques and does not form part of the present invention. Also in good practice of the present invention, as in accordance with the procedures of previously used techniques, samples are generally premixed with copper oxide before being inserted into the combustion tube.

The invention will be more fully illustrated in conjunction with the use of a set up such as that described above. Therein, tube 1 of a commercially available microcombustion unit was packed in successive zones with copper oxide and copper metal as described above. A short subsequent zone also was packed with silver as was discussed above. Furnace temperatures were maintained at about 750° C., and combustion was completed in less than twenty minutes. Conversion tube 10 is a glass tube, 20 cm. long and 1.5 cm. outside diameter, packed with 20–30 mesh (U.S. Standard) calcium carbide. Collecting tube 11 is a glass tube 26 cm. long by 2 cm. outside diameter. During the combustion period it was cooled by immersion in liquid nitrogen in a 600 ml. Dewar flask. Chromatographic column 17 is a 36-inch length of ¼-inch stainless steel tubing, packed for 24 inches with 30–60 mesh silica gel held in place with a glass wool plug six inches from either end. Cells 18 and 20 contain 24,000 ohm thermistors. Recorder 25 has a chart speed of 1.3 cm. per minute and a 5 millivolt full scale response. Column 17 and cells 18 and 20 are immersed in a mineral oil bath thermostatically controlled at 34° C. (±0.02°). Using a helium flow of 25 ml. per minute, elution in most cases was completed in five to six minutes. The apparatus was thoroughly flushed with helium between each run.

In this set up and under these conditions samples of from two to ten mg. weight of a number of typical organic compounds were analyzed. Illustrative results are shown in the following table, wherein the elemental content is given in weight percent.

*Table I*

| Compound | Calculated | | | Found | | |
|---|---|---|---|---|---|---|
| | C | H | N | C | H | N |
| Benzoic Acid | 69.99 | 5.00 | | 69.67 | 4.77 | |
| Acetanilide | 71.09 | 6.76 | 10.38 | 70.66 | 6.65 | 10.44 |
| Nicotinic Acid | 58.54 | 4.09 | 11.37 | 58.61 | 4.40 | 12.09 |
| Benzamidoanthraquinone | 77.07 | 4.00 | 4.27 | 77.37 | 4.21 | 4.95 |
| Brombenzanthrone | 65.30 | 2.91 | | 64.75 | 2.77 | |

We claim:
1. In a procedure for determining at least the elemental carbon, hydrogen and nitrogen content of an organic compound by combustion wherein a sample of said compound is completely pyrolyzed in a heat packed combustion tube through which a sweeping gas is continuously being passed and resultant vapors are passed through a zone packed with a metal oxide selected from the group consisting of the oxides of copper, nickel and cobalt; and subsequently, but while still in said heated combustion tube, the so-treated vapors are passed through a zone packed with copper metal having a large surface area; the improved procedure characterized by the sweeping gas being an inert gas having a boiling point below that of nitrogen, passing the so-treated vapors containing the products of combustion in the inert sweeping gas through an unheated zone packed with material capable of converting any water vapor in said so-treated gases to a gas selected from the group consisting of hydrogen, acetylene and the lower alkanes, which are gases at room temperature and pressure; passing the so-treated gas mixture into a zone cooled to a temperature below at least the boiling point of acetylene; but at which the sweeping gas is not condensable; at least a portion of which cooled zone contains a solid adsorbent for nitrogen gas, and during at least the entire combustion period, collecting and holding in said cooled zone all nitrogen, carbon dioxide and said gas selected from the group consisting of hydrogen, acetylene, and said lower alkanes in the gas mixture, discharging from said cooled zone only said inert sweeping gas, and later discharging and detecting each of the collected nitrogen, carbon dioxide, and said gas selected from the group consisting of hydrogen, acetylene and said lower alkanes.

2. A method according to claim 1 in which said inert sweeping gas is helium.

3. A method according to claim 1 in which said water conversion zone is packed with particulate calcium carbide, whereby water vapor is converted to acetylene rapidly and essentially completely.

4. A method according to claim 1 in which after said combustion period is completed, the inlet to said cooled zone from said water-vapor conversion zone is closed, cooling is discontinued, sweeping gas is admitted, the contents of said cooled zone are completely vaporized and then resultant vapor mixture is passed into the packed adsorption tube of a gas chromatography unit.

5. An analytical procedure for determining elemental carbon, hydrogen and nitrogen in an organic compound by combustion comprising introducing a sample of an organic compound of known mass into a heatable, packed combustion tube, pyrolyzing the sample while sweeping the pyrolysis products with an inert sweeping gas having a boiling point below that of nitrogen through a zone packed with a metal oxide selected from the group consisting of the oxides of copper, nickel and cobalt, and subsequently passing the pyrolysis products through a heated zone packed with copper metal having a large surface area so that any oxides of nitrogen present are reduced, and oxygen removed, then passing the products of combustion together with the sweeping gas at approximately room temperature through a zone packed with a material capable of converting any water vapor to a gas selected from the group consisting of hydrogen, acetylene and the lower alkanes, which are gases at room temperature and pressure, passing the resulting mixture into a zone cooled to a temperature below at least the boiling point of acetylene but at which the sweeping gas is not condensable, at least a portion of which cooled zone contains a solid adsorbent for nitrogen gas, collecting and holding in said cooled zone nitrogen, carbon dioxide, and said gas selected from the group consisting of hydrogen, acetylene and said lower alkanes, discharging from the cooled zone only the inert sweeping gas; and at a subsequent time warming up the cooled zone and passing the components thus held through a chromatographic column, whereby the components are separated, and separately determining the quantity of nitrogen, carbon dioxide and said gas selected from the group consisting of hydrogen, acetylene and said lower alkanes, whereby from said quantities the elemental nitrogen, hydrogen and carbon content of said organic compound may be calculated.

6. A method according to claim 5 in which the inert sweeping gas is helium.

7. An analytical procedure for determining carbon, hydrogen and nitrogen in an organic compound by combustion comprising introducing a sample of an organic compound of known mass into a heatable, packed combustio tube, pyrolyzing the sample while sweeping the pyrolysis products with an inert sweeping gas having a boiling point below that of nitrogen through a zone packed with a metal oxide selected from the group consisting of the oxides of copper, nickel and cobalt, and subsequently passing the pyrolysis products through a heated zone packed with copper metal having a large surface area so that any oxides of nitrogen present are reduced, and oxygen removed, then passing the products of combustion together with the sweeping gas at approximately room temperature through a zone packed with calcium carbide capable of converting any water vaport to acetylene, passing the resulting mixture into a zone cooled to a temperature below at least the boiling point of acetylene but at which the sweeping gas is not condensable; at least a portion of which cooled zone contains a solid adsorbent for nitrogen gas, collecting and holding in said cooled zone the carbon dioxide, nitrogen and acetylene, discharging from the said cooled zone only the inert sweeping gas; and at a subsequnet time warming up the cooled zone and passing the components thus held through a chromatographic column, whereby the components are separated, and separately determining the quantity of carbon dioxide, acetylene and nitrogen, whereby from said quantities the elemental nitrogen, hydrogen and carbon content of said organic compound may be calculated.

8. A method according to claim 7 in which the inert sweeping gas is helium.

9. The method of claim 8 in which the quantities of the carbon dioxide, acetylene and nitrogen are separately determined by thermal conductivity in a catharometer.

10. The method of claim 7 in which the combustion tube packing includes a silver surface to absorb sulfur and halogens, if present in the compound being analyzed.

References Cited by the Examiner

UNITED STATES PATENTS 2,753,246  7/56  Shields _____ 23—230
2,905,536  9/59  Emmett et al. _____ 23—232

OTHER REFERENCES

Duswalt et al.: Anal. Chem., 32, 272–274 (1960).
Tunicliff: Anal. Chem., vol. 18, September 1946, pp. 710 to 718.

MORRIS O. WOLK, *Primary Examiner.*
MAURICE A. BRINDISI, *Examiner.*

UNITED STATES PATENT OFFICE
CERTIFICATE OF CORRECTION

Patent No. 3,168,378                                    February 2, 1965

Charles Maresh et al.

It is hereby certified that error appears in the above numbered patent requiring correction and that the said Letters Patent should read as corrected below.

Column 1, line 22, for "meaturement" read -- measurement --
line 72, for "absorbent", first occurrence, read -- adsorbent --
column 2, line 16, for "absorbent" read -- adsorbent --; line 23
for "at" read -- as --; line 24, for "absorbents" read --
adsorbents --; column 4, line 10, for "absorbent" read -- adsorbent --; line 19, for "dicharged" read -- discharged --; column
5, line 28, for "alumimna" read -- alumina --; column 8, line 10
for "adbsorbent" read -- adsorbent --; lines 28 and 29, for
"combustio" read -- combustion --; line 40, for "vaport" read
-- vapor --; same column 8, line 48, for "subsequnet" read --
subsequent --.

Signed and sealed this 10th day of May 1966.

(SEAL)
Attest:

ERNEST W. SWIDER                                EDWARD J. BRENNER
Attesting Officer                                   Commissioner of Patents